United States Patent
Zhang et al.

(10) Patent No.: US 11,385,733 B2
(45) Date of Patent: Jul. 12, 2022

(54) TOUCH CONTROL DISPLAY PANEL, TOUCH CONTROL DISPLAY APPARATUS, COUNTER SUBSTRATE, AND METHOD OF FABRICATING TOUCH CONTROL DISPLAY PANEL

(71) Applicants: Hefei Xinsheng Optoelectronics Technology Co., Ltd., Anhui (CN); BOE Technology Group Co., Ltd., Beijing (CN)

(72) Inventors: Guiyu Zhang, Beijing (CN); Zouming Xu, Beijing (CN); Tsungchieh Kuo, Beijing (CN); Chen Huang, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 194 days.

(21) Appl. No.: 16/764,942

(22) PCT Filed: Jun. 25, 2019

(86) PCT No.: PCT/CN2019/092761
§ 371 (c)(1),
(2) Date: May 18, 2020

(87) PCT Pub. No.: WO2020/258025
PCT Pub. Date: Dec. 30, 2020

(65) Prior Publication Data
US 2021/0405792 A1 Dec. 30, 2021

(51) Int. Cl.
*G06F 3/044* (2006.01)
*G02F 1/1333* (2006.01)
(Continued)

(52) U.S. Cl.
CPC ........ *G06F 3/0412* (2013.01); *G02F 1/13338* (2013.01); *G02F 1/133512* (2013.01);
(Continued)

(58) Field of Classification Search
CPC .... G06F 3/0412; G06F 3/0445; G06F 3/0446; G06F 2203/04112; G06F 2203/04107;
(Continued)

(56) References Cited

U.S. PATENT DOCUMENTS

2014/0168138 A1* 6/2014 Kuo ................... G06F 3/0443
345/174

FOREIGN PATENT DOCUMENTS

CN   104317448 B   10/2017
CN   107390926 A   11/2017
(Continued)

OTHER PUBLICATIONS

English language translation of Chinese patent application publication No. CN10937970. Translation downloaded from Espacenet on Jan. 24, 2022 at https://worldwide.espacenet.com/; translation provided by Google Translate tool on website. (Year: 2017).*
(Continued)

*Primary Examiner* — Angela K Davison
(74) *Attorney, Agent, or Firm* — Intellectual Valley Law, P.C.

(57) ABSTRACT

A touch control display panel having a subpixel region and an inter-subpixel region is provided. The touch control display panel includes an array substrate and a counter substrate facing the array substrate. The counter substrate includes a base substrate; a first black matrix layer on the base substrate; a plurality of touch electrodes on the base substrate; and a second black matrix layer on a side of the plurality of touch electrodes away from the first black matrix layer. The first black matrix layer, the second black matrix
(Continued)

layer, and the plurality of touch electrodes are limited in the inter-subpixel region. Orthographic projections of the first black matrix layer and the second black matrix layer on the base substrate substantially cover an entirety of an orthographic projection of the plurality of touch electrodes on the base substrate.

17 Claims, 5 Drawing Sheets

(51) Int. Cl.
    *G02F 1/1335*     (2006.01)
    *G06F 3/041*     (2006.01)

(52) U.S. Cl.
    CPC ...... *G06F 3/0443* (2019.05); *G02F 1/133516* (2013.01); *G06F 2203/04103* (2013.01); *G06F 2203/04112* (2013.01)

(58) Field of Classification Search
CPC . G06F 5/003; G02F 1/13338; G02F 1/133512
See application file for complete search history.

(56) References Cited

FOREIGN PATENT DOCUMENTS

| | | |
|---|---|---|
| CN | 109283718 A | 1/2019 |
| CN | 109387970 A | 2/2019 |
| CN | 109426375 A | 3/2019 |

OTHER PUBLICATIONS

International Search Report & Written Opinion dated Mar. 26, 2020, regarding PCT/CN2019/092761.

\* cited by examiner

TOUCH CONTROL DISPLAY PANEL, TOUCH CONTROL DISPLAY APPARATUS, COUNTER SUBSTRATE, AND METHOD OF FABRICATING TOUCH CONTROL DISPLAY PANEL

CROSS-REFERENCE TO RELATED APPLICATION

This application is a national stage application under 35 U.S.C. § 371 of International Application No. PCT/CN2019/092761, filed Jun. 25, 2019, the contents of which are incorporated by reference in the entirety.

TECHNICAL FIELD

The present invention relates to display technology, more particularly, to a touch control display panel, a touch control display apparatus, a counter substrate, and a method of fabricating a touch control display panel.

BACKGROUND

Touch control display panels have found a wide range of applications in the display field such as mobile phones, computer display panels, touch screens, satellite navigation devices, and digital cameras. Touch control display panels can be categorized into three classes: add-on type touch panels, on-cell type touch panels, and in-cell type touch panels. Touch control display panels may be a self-capacitive type or a mutual capacitive type touch display panel. Touch control display panels may use mesh electrodes as the touch electrodes or use metal oxide materials (e.g., indium tin oxide) as the touch electrode material.

SUMMARY

In one aspect, the present invention provides a touch control display panel having a subpixel region and an inter-subpixel region, comprising an array substrate and a counter substrate facing the array substrate; wherein the counter substrate comprises a base substrate; a first black matrix layer on the base substrate; a plurality of touch electrodes on the base substrate; and a second black matrix layer on a side of the plurality of touch electrodes away from the first black matrix layer; wherein the first black matrix layer, the second black matrix layer, and the plurality of touch electrodes are limited in the inter-subpixel region; an orthographic projection of the first black matrix layer on the base substrate substantially covers an entirety of an orthographic projection of the plurality of touch electrodes on the base substrate; and an orthographic projection of the second black matrix layer on the base substrate substantially covers the entirety of the orthographic projection of the plurality of touch electrodes on the base substrate.

Optionally, the plurality of touch electrodes comprise a first touch electrode layer and a second touch electrode layer; the first touch electrode layer comprises a plurality of first touch electrodes on a side of the first black matrix layer away from the base substrate; the second touch electrode layer comprises a plurality of second touch electrodes on a side of the first touch electrode layer away from the first black matrix layer; the counter substrate further comprises an insulating layer between the first touch electrode layer and the second touch electrode layer; the orthographic projection of the first black matrix layer on the base substrate substantially covers an entirety of an orthographic projection of the plurality of first touch electrodes on the base substrate and substantially covers an entirety of an orthographic projection of the plurality of second touch electrodes on the base substrate; and the orthographic projection of the second black matrix layer on the base substrate substantially covers an entirety of the orthographic projection of the plurality of first touch electrodes on the base substrate and substantially covers an entirety of the orthographic projection of the plurality of second touch electrodes on the base substrate.

Optionally, the first black matrix layer is made of an insulating light absorbing material; and the plurality of first touch electrodes are in direct contact with the first black matrix layer.

Optionally, the touch control display panel further comprises a planarization layer on a side of the second touch electrode layer away from the base substrate; and a color filter layer comprising a plurality of color filter blocks in the subpixel region.

Optionally, the plurality of color filter blocks are in direct contact with the planarization layer; and the plurality of second touch electrodes are in direct contact with the planarization layer.

Optionally, the orthographic projection of the first black matrix layer on the base substrate and the orthographic projection of the second black matrix layer on the base substrate substantially overlap with each other.

Optionally, the plurality of touch electrodes are a plurality of metal mesh touch electrodes.

In another aspect, the present invention provides a touch control display apparatus, comprising the touch control display panel of described herein or fabricated by a method described herein; and a back light on a side of the array substrate away from the counter substrate; wherein the array substrate comprises a plurality of thin film transistors for driving image display of the touch control display apparatus; wherein the touch control display panel further comprises a liquid crystal layer between the array substrate and the counter substrate; the second black matrix layer is on a side of the liquid crystal layer away from the back light; and the first black matrix layer is on a side of the second black matrix layer away from the liquid crystal layer.

In another aspect, the present invention provides a counter substrate having a subpixel region and an inter-subpixel region, comprising a base substrate; a first black matrix layer on the base substrate; a plurality of touch electrodes on the base substrate; and a second black matrix layer on a side of the plurality of touch electrodes away from the first black matrix layer; wherein the first black matrix layer, the second black matrix layer, and the plurality of touch electrodes are limited in the inter-subpixel region; an orthographic projection of the first black matrix layer on the base substrate substantially covers an entirety of an orthographic projection of the plurality of touch electrodes on the base substrate; and an orthographic projection of the second black matrix layer on the base substrate substantially covers the entirety of the orthographic projection of the plurality of touch electrodes on the base substrate.

Optionally, the plurality of touch electrodes comprise a first touch electrode layer and a second touch electrode layer; the first touch electrode layer comprises a plurality of first touch electrodes on a side of the first black matrix layer away from the base substrate; the second touch electrode layer comprises a plurality of second touch electrodes on a side of the first touch electrode layer away from the first black matrix layer; the counter substrate further comprises an insulating layer between the first touch electrode layer and the second touch electrode layer; the orthographic projection of the first black matrix layer on the base substrate substantially covers an entirety of an orthographic projection of the plurality of first touch electrodes on the base substrate and substantially covers an entirety of an orthographic projection of the plurality of second touch electrodes on the base substrate; and the orthographic projection of the second black matrix layer on the base substrate substantially covers an entirety of the orthographic projection of the plurality of first touch electrodes on the base substrate and substantially covers an entirety of the orthographic projection of the plurality of second touch electrodes on the base substrate.

Optionally, the first black matrix layer is made of an insulating light absorbing material; and the plurality of first touch electrodes are in direct contact with the first black matrix layer.

Optionally, the counter substrate further comprises a planarization layer on a side of the second touch electrode layer away from the base substrate; and a color filter layer comprising a plurality of color filter blocks in the subpixel region.

Optionally, the plurality of color filter blocks are in direct contact with the planarization layer; and the plurality of second touch electrodes are in direct contact with the planarization layer.

Optionally, the orthographic projection of the first black matrix layer on the base substrate and the orthographic projection of the second black matrix layer on the base substrate substantially overlap with each other.

Optionally, the plurality of touch electrodes are a plurality of metal mesh touch electrodes.

In another aspect, the present invention provides a method of fabricating a touch control display panel having a subpixel region and an inter-subpixel region, comprising forming an array substrate; forming a counter substrate; and assembling the array substrate and the counter substrate into a cell; wherein forming the counter substrate comprises forming a first black matrix layer on a base substrate; forming a plurality of touch electrodes on the base substrate; and forming a second black matrix layer on a side of the plurality of touch electrodes away from the first black matrix layer; wherein the first black matrix layer, the second black matrix layer, and the plurality of touch electrodes are formed to be limited in the inter-subpixel region; an orthographic projection of the first black matrix layer on the base substrate substantially covers an entirety of an orthographic projection of the plurality of touch electrodes on the base substrate; and an orthographic projection of the second black matrix layer on the base substrate substantially covers the entirety of the orthographic projection of the plurality of touch electrodes on the base substrate.

Optionally, forming the plurality of touch electrodes comprises forming a first touch electrode layer comprising a plurality of first touch electrodes on the base substrate; forming an insulating layer on a side of the first touch electrode layer away from the base substrate; and forming a second touch electrode layer comprising a plurality of second touch electrodes on a side of the insulating layer away from the first touch electrode layer; wherein the orthographic projection of the first black matrix layer on the base substrate substantially covers an entirety of an orthographic projection of the plurality of first touch electrodes on the base substrate and substantially covers an entirety of an orthographic projection of the plurality of second touch electrodes on the base substrate; and the orthographic projection of the second black matrix layer on the base substrate substantially covers an entirety of the orthographic projection of the plurality of first touch electrodes on the base substrate and substantially covers an entirety of the orthographic projection of the plurality of second touch electrodes on the base substrate.

Optionally, the first black matrix layer is made of an insulating light absorbing material; and the plurality of first touch electrodes are formed to be in direct contact with the first black matrix layer.

Optionally, forming the counter substrate further comprises forming a planarization layer on a side of the second touch electrode layer away from the base substrate; and forming a color filter layer comprising a plurality of color filter blocks in the subpixel region.

Optionally, the plurality of color filter blocks are formed to be in direct contact with the planarization layer; and the plurality of second touch electrodes are formed to be in direct contact with the planarization layer.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

It is discovered in the present disclosure that touch electrodes fabricated on a counter substrate of a display panel often lead to Moiré pattern and anti-blanking effect occur frequently due to the presence of the metal lines of the touch electrodes, affecting display quality in the conventional metal electrode touch panels. It is further discovered in the present disclosure that, in a display panel using a back light for image display, the metal lines of the touch electrodes can reflect the light emitted from the back light, the reflected light irradiates on an active layer of the thin film transistor of the display panel, adversely affecting properties and performance of the thin film transistor.

Accordingly, the present disclosure provides, inter alia, a touch control display panel, a touch control display apparatus, a counter substrate, and a method of fabricating a touch control display panel that substantially obviate one or more of the problems due to limitations and disadvantages of the related art. In one aspect, the present disclosure provides a touch control display panel having a subpixel region and an inter-subpixel region. In some embodiments, the touch control display panel includes an array substrate and a counter substrate facing the array substrate. The counter substrate in some embodiments includes a base substrate; a first black matrix layer on the base substrate; a plurality of touch electrodes on the base substrate; and a second black matrix layer on a side of the plurality of touch electrodes away from the first black matrix layer. The first black matrix layer, the second black matrix layer, and the plurality of touch electrodes are limited in the inter-subpixel region. In the present touch control display panel, an orthographic projection of the first black matrix layer on the base substrate substantially covers an entirety of an orthographic projection of the plurality of touch electrodes on the base substrate; and an orthographic projection of the second black matrix layer on the base substrate substantially covers the entirety of the orthographic projection of the plurality of touch electrodes on the base substrate.

As used herein, a subpixel region refers to a light emission region of a subpixel, such as a region corresponding to a pixel electrode in a liquid crystal display, a region corresponding to a light emissive layer in an organic light emitting diode display panel, or a region corresponding to the light transmission layer in the present disclosure. Optionally, a pixel may include a number of separate light emission regions corresponding to a number of subpixels in the pixel. Optionally, the subpixel region is a light emission region of a red color subpixel. Optionally, the subpixel region is a light emission region of a green color subpixel. Optionally, the subpixel region is a light emission region of a blue color subpixel. Optionally, the subpixel region is a light emission region of a white color subpixel.

As used herein, an inter-subpixel region refers to a region between adjacent subpixel regions, such as a region corresponding to a black matrix in a liquid crystal display, a region corresponding to a pixel definition layer in an organic light emitting diode display panel, or a region corresponding to a black matrix in the present display panel. Optionally, the inter-subpixel region is a region between adjacent subpixel regions in a same pixel. Optionally, the inter-subpixel region is a region between two adjacent subpixel regions from two adjacent pixels. Optionally, the inter-subpixel region is a region between a subpixel region of a red color subpixel and a subpixel region of an adjacent green color subpixel. Optionally, the inter-subpixel region is a region between a subpixel region of a red color subpixel and a subpixel region of an adjacent blue color subpixel. Optionally, the inter-subpixel region is a region between a subpixel region of a green color subpixel and a subpixel region of an adjacent blue color subpixel.

As used herein, the term "substantially covers" refers to one orthographic projection being at least 50%, at least 60%, at least 70%, at least 80%, at least 90%, at least 95%, at least 99%, or 100% covered by another orthographic projection.

Figure 1:
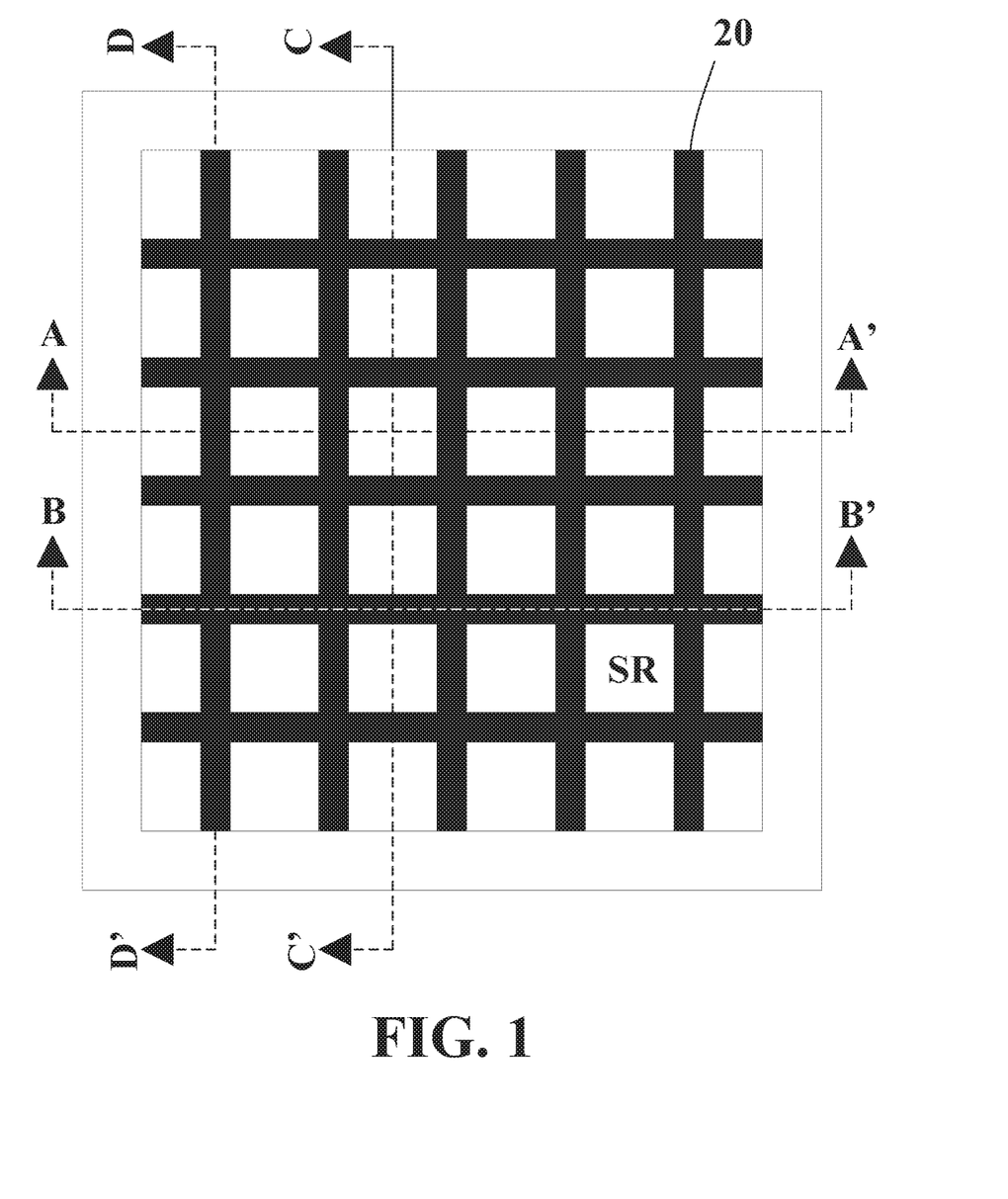
FIG. 1 is a plan view of a touch control display panel in some embodiments according to the present disclosure.
Figure 2:
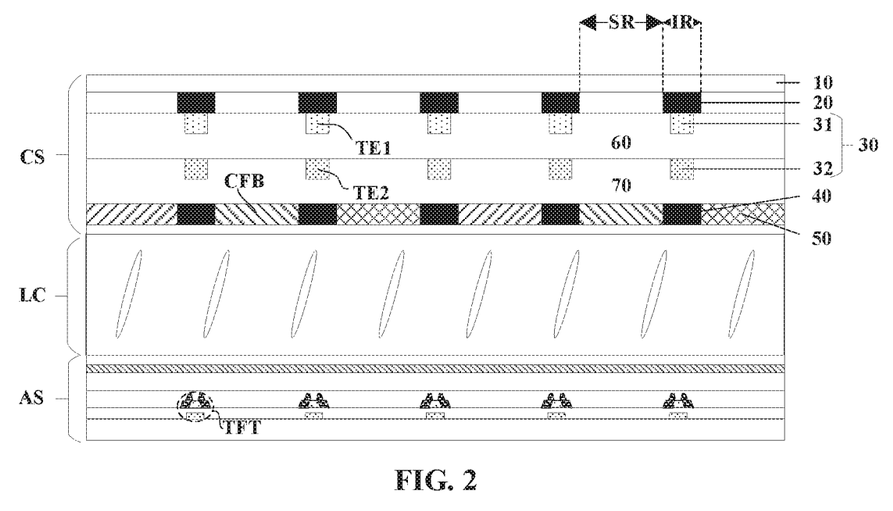
FIG. 2 is a cross-sectional view along an A-A' line of the touch control display panel in FIG. 1.
Figure 3:
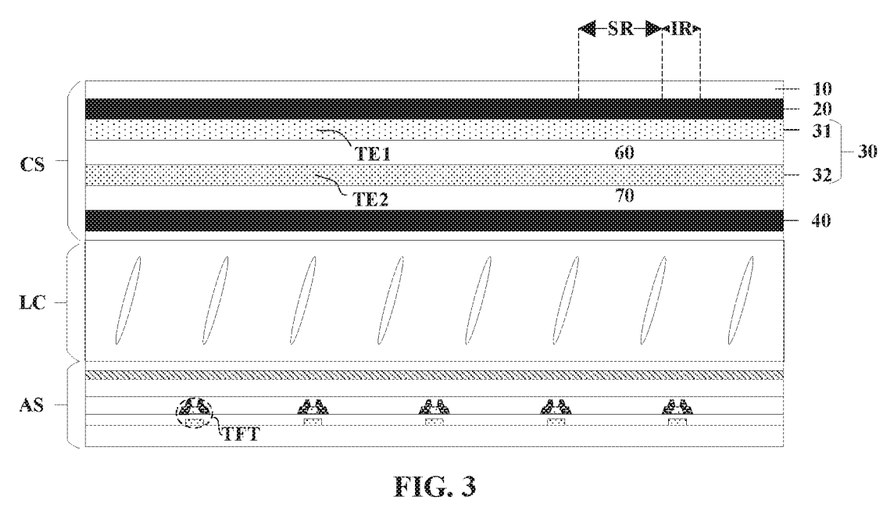
FIG. 3 is a cross-sectional view along a B-B' line of the touch control display panel in FIG. 1.
Figure 4:
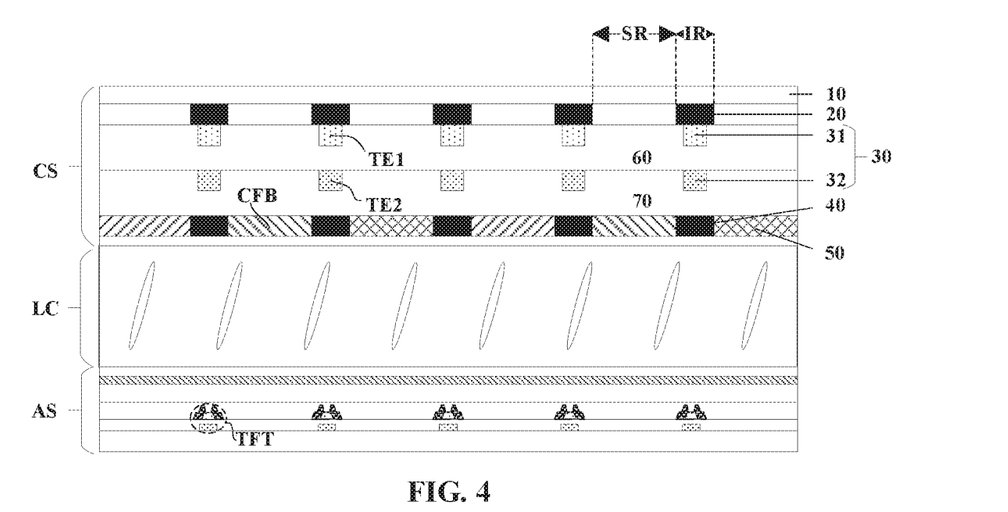
FIG. 4 is a cross-sectional view along a C-C' line of the touch control display panel in FIG. 1.
Figure 5:
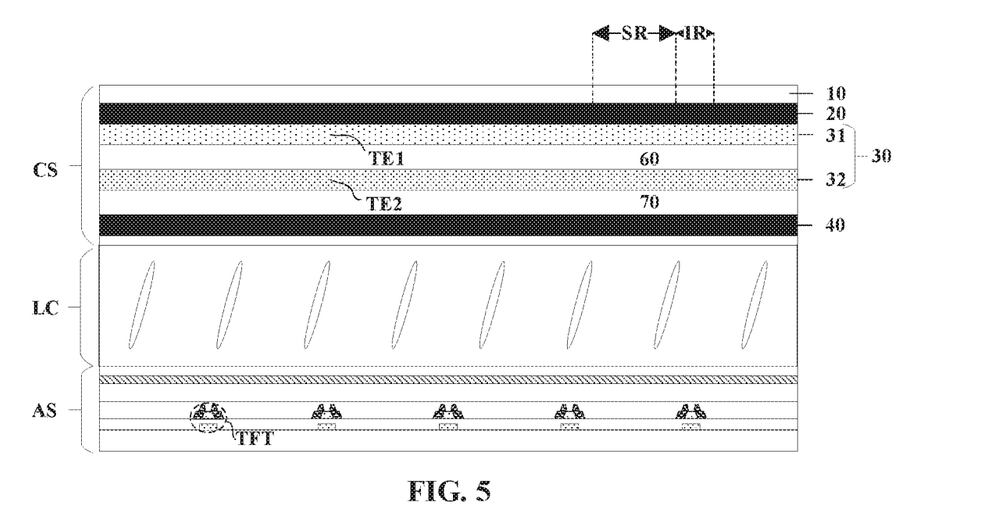
FIG. 5 is a cross-sectional view along a D-D' line of the touch control display panel in FIG. 1.

FIG. 1 is a plan view of a touch control display panel in some embodiments according to the present disclosure. FIG. 2 is a cross-sectional view along an A-A' line of the touch control display panel in FIG. 1. FIG. 3 is a cross-sectional view along a B-B' line of the touch control display panel in FIG. 1. FIG. 4 is a cross-sectional view along a C-C' line of the touch control display panel in FIG. 1. FIG. 5 is a cross-sectional view along a D-D' line of the touch control display panel in FIG. 1. Referring to FIGS. 1 to 5, the touch control display panel has a subpixel region SR and an inter-subpixel region IR. In some embodiments, the touch control display panel includes an array substrate AS and a counter substrate CS facing the array substrate AS. The counter substrate CS in some embodiments includes a base substrate 10; a first black matrix layer 20 on the base substrate 10; a plurality of touch electrodes 30 on the base substrate 10; and a second black matrix layer 40 on a side of the plurality of touch electrodes 30 away from the first black matrix layer 20.

In some embodiments, the touch control display panel further includes a liquid crystal layer LC between the array substrate AS and the counter substrate CS. Optionally, the array substrate AS includes a plurality of thin film transistors TFT for driving image display of the touch control display panel. Optionally, the second black matrix layer 40 is on a side of the liquid crystal layer LC away from the array substrate AS. Optionally, the first black matrix layer 20 is on a side of the second black matrix layer 40 away from the liquid crystal layer LC.

In the present touch control display panel, the first black matrix layer 20, the second black matrix layer 40, and the plurality of touch electrodes 30 are limited in the inter-subpixel region IR. Optionally, an orthographic projection of the first black matrix layer 20 on the base substrate 10 substantially covers an entirety of an orthographic projection of the plurality of touch electrodes 30 on the base substrate 10; and an orthographic projection of the second black matrix layer 40 on the base substrate 10 substantially covers the entirety of the orthographic projection of the plurality of touch electrodes 30 on the base substrate 10. Optionally, an orthographic projection of the first black matrix layer 20 on the base substrate 10 completely covers an entirety of an orthographic projection of the plurality of touch electrodes 30 on the base substrate 10; and an orthographic projection of the second black matrix layer 40 on the base substrate 10 completely covers the entirety of the orthographic projection of the plurality of touch electrodes 30 on the base substrate 10. Optionally, an orthographic projection of the first black matrix layer 20 on the base substrate 10 completely covers an entirety of an orthographic projection of the plurality of touch electrodes 30 on the base substrate 10, with at least a 10% margin e.g., at least 15% margin, at least 20% margin, or at least 25% margin); and an orthographic projection of the second black matrix layer 40 on the base substrate 10 completely covers the entirety of the orthographic projection of the plurality of touch electrodes 30 on the base substrate 10, with at least a 10% margin (e.g., at least 15% margin, at least 20% margin, or at least 25% margin).

In some embodiments, the plurality of touch electrodes 30 include a first touch electrode layer 31 and a second touch electrode layer 32 spaced apart from each other. Referring to FIG. 2 to FIG. 5, in some embodiments, the counter substrate CS further includes an insulating layer 60 between the first touch electrode layer 31 and the second touch electrode layer 32. The first touch electrode layer 31 includes a plurality of first touch electrodes TE1 on a side of the first black matrix layer 20 away from the base substrate 10. The second touch electrode layer 32 includes a plurality of second touch electrodes TE2 on a side of the first touch electrode layer 31 away from the first black matrix layer 20.

Optionally, the orthographic projection of the first black matrix layer 20 on the base substrate 10 substantially covers an entirety of an orthographic projection of the plurality of first touch electrodes TE1 on the base substrate 10 and substantially covers an entirety of an orthographic projection of the plurality of second touch electrodes TE2 on the base substrate 10; and the orthographic projection of the second black matrix layer 40 on the base substrate 10 substantially covers an entirety of the orthographic projection of the plurality of first touch electrodes TE1 on the base substrate 10 and substantially covers an entirety of the orthographic projection of the plurality of second touch electrodes TE2 on the base substrate 10. Optionally, the orthographic projection of the first black matrix layer 20 on the base substrate 10 completely covers an entirety of an orthographic projection of the plurality of first touch electrodes TE1 on the base substrate 10 and substantially covers an entirety of an orthographic projection of the plurality of second touch electrodes TE2 on the base substrate 10; and the orthographic projection of the second black matrix layer 40 on the base substrate 10 completely covers an entirety of the orthographic projection of the plurality of first touch electrodes TE1 on the base substrate 10 and substantially covers an entirety of the orthographic projection of the plurality of second touch electrodes TE2 on the base substrate 10. Optionally, the orthographic projection of the first black matrix layer 20 on the base substrate 10 completely covers an entirety of an orthographic projection of the plurality of first touch electrodes TE1 on the base substrate 10 and substantially covers an entirety of an orthographic projection of the plurality of second touch electrodes TE2 on the base substrate 10, with at least a 10% margin (e.g., at least 15% margin, at least 20% margin, or at least 25% margin); and the orthographic projection of the second black matrix layer 40 on the base substrate 10 completely covers an entirety of the orthographic projection of the plurality of first touch electrodes TE1 on the base substrate 10 and substantially covers an entirety of the orthographic projection of the plurality of second touch electrodes TE2 on the base substrate 10, with at least a 10% margin (e.g., at least 15% margin, at least 20% margin, or at least 25% margin).

In some embodiments, the orthographic projection of the first black matrix layer 20 on the base substrate 10 and the orthographic projection of the second black matrix layer 40 on the base substrate 10 substantially overlap with each other. As used herein, the term "substantially overlap" refers to two orthographic projections at least 50%, e.g., at least 60%, at least 70%, at least 80%, at least 90%, at least 95%, at least 99%, or 100%, overlapping with each other. Optionally, the first black matrix layer 20 and the second black matrix layer 40 are made of a same material. Optionally, the first black matrix layer 20 and the second black matrix layer 40 are patterned using a same mask plate.

Various appropriate materials may be used for making the first black matrix layer 20 and the second black matrix layer 40. Examples of material for making the first black matrix layer 20 and the second black matrix layer 40 include, but are not limited to, black organic polymer materials, materials absorbing light having a selected wavelength ranges, and photoresistor materials. Optionally, the black organic polymer materials include ABS resin (e.g., acrylonitrile-butadiene-styrene copolymer). Optionally, the photoresistor materials include SU-8 photoresistor. Optionally, the first black matrix layer 20 and the second black matrix layer 40 are made of an insulating light absorbing material. Optionally, the insulating light absorbing material has an optical density of 4 or more, e.g., 5 or more, 6 or more.

In some embodiments, the first black matrix layer is made of an insulating light absorbing material. Referring to FIG. 2 and FIG. 4, in some embodiments, the plurality of first touch electrodes TE1 are in direct contact with the first black matrix layer 20. In one example, the plurality of first touch electrodes TE1 are in direct contact with the first black matrix layer 20, and are in direct contact with the insulating layer 60. The insulating layer 60 is in direct contact with the plurality of first touch electrodes TE1, and is in direct contact with the plurality of second touch electrodes TE2.

In some embodiments, the touch control display panel further includes a planarization layer 70 on a side of the second touch electrode layer 32 away from the base substrate 10. In one example, the planarization layer 70 is in direct contact with the plurality of second touch electrodes TE2, and is in direct contact with the second black matrix layer 40.

Figure 6:
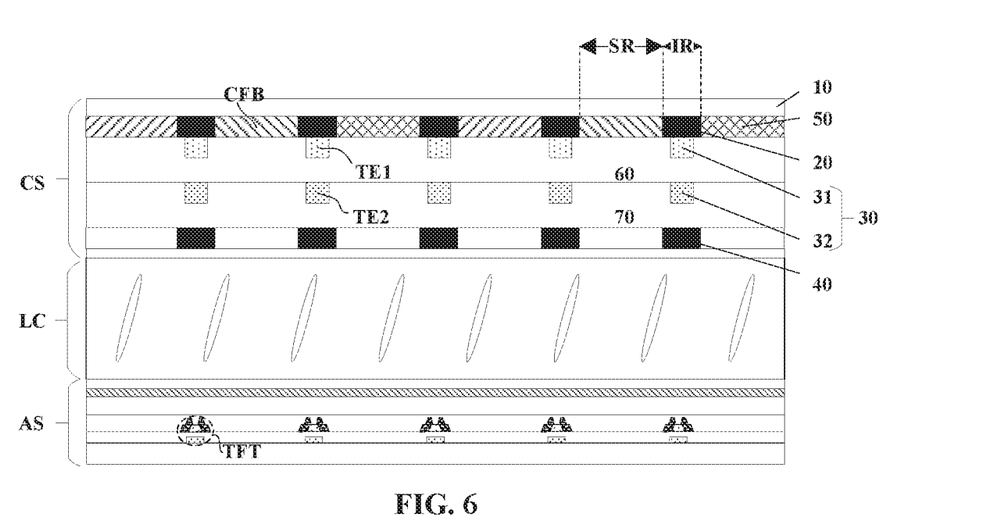
FIG. 6 is a cross-sectional view of a touch control display panel in some embodiments according to the present disclosure.

In some embodiments, the touch control display panel further includes a color filter layer 50 including a plurality of color filter blocks CFB in the subpixel region SR. Referring to FIG. 2 and FIG. 4, in some embodiments, the color filter layer 50 is on a side of the planarization layer 70 away from the base substrate 10. Optionally, the color filter layer 50 and the first black matrix layer 20 are substantially co-planar with respect to a surface of the planarization layer 70. Optionally, the plurality of color filter blocks CFB are in direct contact with the planarization layer 70; and the plurality of second touch electrodes TE2 are in direct contact with the planarization layer 70, FIG. 6 is a cross-sectional view of a touch control display panel in some embodiments according to the present disclosure. Referring to FIG. 6, in some embodiments, the color filter layer 50 is between the base substrate 10 and the insulating layer 60. Optionally, the color filter layer 50 and the first black matrix layer 20 are substantially co-planar with respect to a surface of the base substrate 10. Optionally, the plurality of color filter blocks CFB are in direct contact with the insulating layer 60.

Various appropriate conductive materials may be used for making the plurality of first touch electrodes TE1 and the plurality of second touch electrodes TE2. Examples of transparent conductive materials suitable for making the transparent touch signal lines include, but are not limited to, nano-silver, indium tin oxide, indium zinc oxide, indium gallium oxide, indium gallium zinc oxide, nano-carbon tube, and graphene. Optionally, the plurality of first touch electrodes TE1 and the plurality of second touch electrodes TE2 are made of a metallic material. Optionally, the plurality of first touch electrodes TE1 and the plurality of second touch electrodes TE2 are mesh touch electrodes. Optionally, the plurality of first touch electrodes TE1 and the plurality of second touch electrodes TE2 are metal mesh touch electrodes.

Various appropriate conductive electrode material may be used for making the plurality of first touch electrodes TE1 and the plurality of second touch electrodes TE2. In some embodiments, the conductive electrode material for making the mesh electrode pattern is a transparent conductive electrode material. Examples of conductive electrode materials for making the mesh electrode pattern of the touch electrode layer include, but are not limited to, a metal mesh, a silver nano wire, a carbon nano tube, a nano mesh, graphene, and conductive polymers such as poly(3,4-ethylenedioxythiophene) polystyrene sulfonate (PEDOT:PSS). Optionally, the mesh electrode pattern is made of a metal mesh such as a nano-silver mesh.

Figure 7:
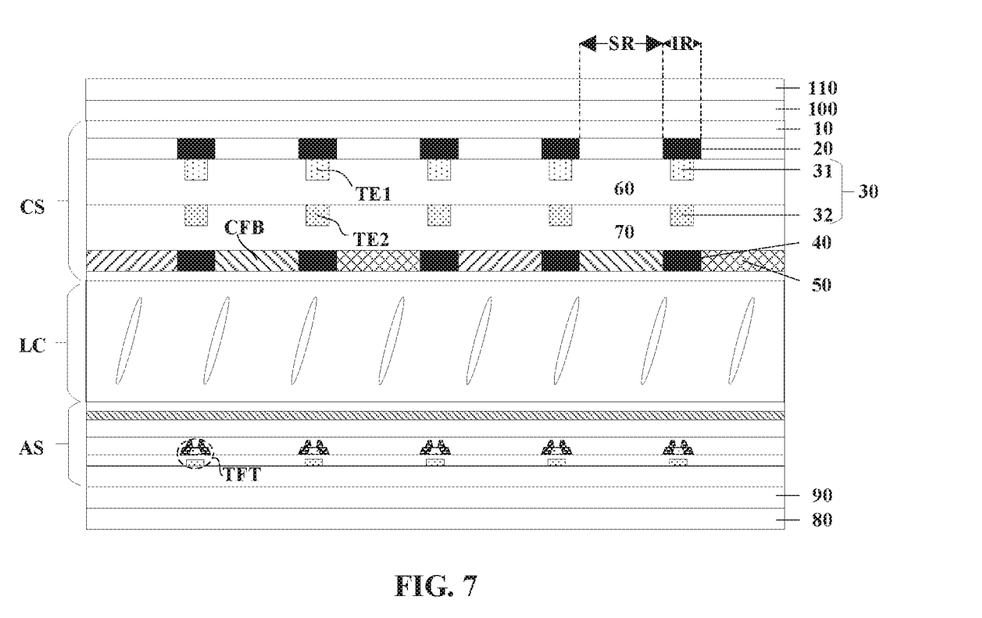
FIG. 7 is a cross-sectional view of a touch control display apparatus in some embodiments according to the present disclosure.

In another aspect, the present disclosure provides a touch control display apparatus having the touch control display panel described herein or fabricated by a method described herein. FIG. 7 is a cross-sectional view of a touch control display apparatus in some embodiments according to the present disclosure. Referring to FIG. 7, in some embodiments, the touch control display apparatus further includes a back light 80 on a side of the array substrate AS away from the counter substrate CS for providing light for the image display. The touch control display apparatus in some embodiments further includes a lower polarizer 90 between the back light 80 and the plurality of thin film transistors TFT, and an upper polarizer 100 on a side of the base substrate 10 away from the array substrate AS. Optionally, the touch control display apparatus further includes a cover lens 110 on a side of the upper polarizer 100 away from the array substrate AS. Optionally, the second black matrix layer 40 is on a side of the liquid crystal layer LC away from the back light 80; and the first black matrix layer 20 is on a side of the second black matrix layer 40 away from the liquid crystal layer LC.

Examples of appropriate touch control display apparatuses include, but are not limited to, an electronic paper, a mobile phone, a tablet computer, a television, a monitor, a notebook computer, a digital album, a GPS, etc. Optionally, the touch control display apparatus further includes one or more integrated circuits connected to the touch control display panel.

Figure 8:
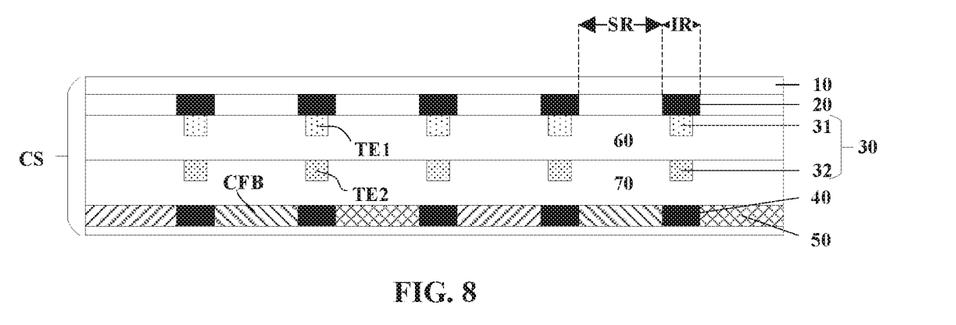
FIG. 8 is a cross-sectional view of a counter substrate in some embodiments according to the present disclosure.

In another aspect, the present disclosure provides a counter substrate having a subpixel region and an inter-subpixel region. FIG. 8 is a cross-sectional view of a counter substrate in some embodiments according to the present disclosure. Referring to FIG. 8, in some embodiments, the counter substrate CS includes a base substrate 10; a first black matrix layer 20 on the base substrate 10; a plurality of touch electrodes 30 on the base substrate 10; and a second black matrix layer 40 on a side of the plurality of touch electrodes 30 away from the first black matrix layer 20.

In the present counter substrate, the first black matrix layer 20, the second black matrix layer 40, and the plurality of touch electrodes 30 are limited in the inter-subpixel region IR. Optionally, an orthographic projection of the first black matrix layer 20 on the base substrate 10 substantially covers an entirety of an orthographic projection of the plurality of touch electrodes 30 on the base substrate 10; and an orthographic projection of the second black matrix layer 40 on the base substrate 10 substantially covers the entirety of the orthographic projection of the plurality of touch electrodes 30 on the base substrate 10. Optionally, an orthographic projection of the first black matrix layer 20 on the base substrate 10 completely covers an entirety of an orthographic projection of the plurality of touch electrodes 30 on the base substrate 10; and an orthographic projection of the second black matrix layer 40 on the base substrate 10 completely covers the entirety of the orthographic projection of the plurality of touch electrodes 30 on the base substrate 10. Optionally, an orthographic projection of the first black matrix layer 20 on the base substrate 10 completely covers an entirety of an orthographic projection of the plurality of touch electrodes 30 on the base substrate 10, with at least a 10% margin (e.g., at least 15% margin, at least 20% margin, or at least 25% margin); and an orthographic projection of the second black matrix layer 40 on the base substrate 10 completely covers the entirety of the orthographic projection of the plurality of touch electrodes 30 on the base substrate 10, with at least a 10% margin (e.g., at least 15% margin, at least 20% margin, or at least 25% margin).

In some embodiments, the plurality of touch electrodes 30 include a first touch electrode layer 31 and a second touch electrode layer 32 spaced apart from each other. Referring to FIG. 8, in some embodiments, the counter substrate CS further includes an insulating layer 60 between the first touch electrode layer 31 and the second touch electrode layer 32. The first touch electrode layer 31 includes a plurality of first touch electrodes TE1 on a side of the first black matrix layer 20 away from the base substrate 10. The second touch electrode layer 32 includes a plurality of second touch electrodes TE2 on a side of the first touch electrode layer 31 away from the first black matrix layer 20.

Optionally, the orthographic projection of the first black matrix layer 20 on the base substrate 10 substantially covers an entirety of an orthographic projection of the plurality of first touch electrodes TE1 on the base substrate 10 and substantially covers an entirety of an orthographic projection of the plurality of second touch electrodes TE2 on the base substrate 10; and the orthographic projection of the second black matrix layer 40 on the base substrate 10 substantially covers an entirety of the orthographic projection of the plurality of first touch electrodes TE1 on the base substrate 10 and substantially covers an entirety of the orthographic projection of the plurality of second touch electrodes TE2 on the base substrate 10. Optionally, the orthographic projection of the first black matrix layer 20 on the base substrate 10 completely covers an entirety of an orthographic projection of the plurality of first touch electrodes TE1 on the base substrate 10 and substantially covers an entirety of an orthographic projection of the plurality of second touch electrodes TE2 on the base substrate 10; and the orthographic projection of the second black matrix layer 40 on the base substrate 10 completely covers an entirety of the orthographic projection of the plurality of first touch electrodes TE1 on the base substrate 10 and substantially covers an entirety of the orthographic projection of the plurality of second touch electrodes TE2 on the base substrate 10. Optionally, the orthographic projection of the first black matrix layer 20 on the base substrate 10 completely covers an entirety of an orthographic projection of the plurality of first touch electrodes TE1 on the base substrate 10 and substantially covers an entirety of an orthographic projection of the plurality of second touch electrodes TE2 on the base substrate 10, with at least a 10% margin (e.g., at least 15% margin, at least 20% margin, or at least 25% margin); and the orthographic projection of the second black matrix layer 40 on the base substrate 10 completely covers an entirety of the orthographic projection of the plurality of first touch electrodes TE1 on the base substrate 10 and substantially covers an entirety of the orthographic projection of the plurality of second touch electrodes TE2 on the base substrate 10, with at least a 10% margin (e.g., at least 15% margin, at least 20% margin, or at least 25% margin).

In some embodiments, the orthographic projection of the first black matrix layer 20 on the base substrate 10 and the orthographic projection of the second black matrix layer 40 on the base substrate 10 substantially overlap with each other. Optionally, the first black matrix layer 20 and the second black matrix layer 40 are made of a same material. Optionally, the first black matrix layer 20 and the second black matrix layer 40 are patterned using a same mask plate.

In some embodiments, the plurality of first touch electrodes TE1 are in direct contact with the first black matrix layer 20. In one example, the plurality of first touch electrodes TE1 are in direct contact with the first black matrix layer 20, and are in direct contact with the insulating layer 60. The insulating layer 60 is in direct contact with the plurality of first touch electrodes TE1, and is in direct contact with the plurality of second touch electrodes TE2.

In some embodiments, the counter substrate CS further includes a planarization layer 70 on a side of the second touch electrode layer 32 away from the base substrate 10. In one example, the planarization layer 70 is in direct contact with the plurality of second touch electrodes TE2, and is in direct contact with the second black matrix layer 40.

In some embodiments, the counter substrate CS further includes a color filter layer 50 including a plurality of color filter blocks CFB in the subpixel region SR. Referring to FIG. 8, in some embodiments, the color filter layer 50 is on a side of the planarization layer 70 away from the base substrate 10. Optionally, the color filter layer 50 and the first black matrix layer 20 are substantially co-planar with respect to a surface of the planarization layer 70. Optionally, the plurality of color filter blocks CFB are in direct contact with the planarization layer 70; and the plurality of second touch electrodes TE2 are in direct contact with the planarization layer 70.

In some embodiments, the color filter layer 50 is between the base substrate 10 and the insulating layer 60. Optionally, the color filter layer 50 and the second black matrix layer 40 are substantially co-planar with respect to a surface of the base substrate 10. Optionally, the plurality of color filter blocks CFB are in direct contact with the insulating layer 60.

In another aspect, the present disclosure provides a method of fabricating a touch control display panel having a subpixel region and an inter-subpixel region. In some embodiments, the method includes forming an array substrate; forming a counter substrate; and assembling the array substrate and the counter substrate into a cell. In some embodiments, forming the counter substrate includes forming a first black matrix layer on a base substrate; forming a plurality of touch electrodes on the base substrate; and forming a second black matrix layer on a side of the plurality of touch electrodes away from the first black matrix layer. Optionally, the first black matrix layer, the second black matrix layer, and the plurality of touch electrodes are formed to be limited in the inter-subpixel region. Optionally, an orthographic projection of the first black matrix layer on the base substrate substantially covers an entirety of an orthographic projection of the plurality of touch electrodes on the base substrate. Optionally, an orthographic projection of the second black matrix layer on the base substrate substantially covers the entirety of the orthographic projection of the plurality of touch electrodes on the base substrate.

In some embodiments, forming the plurality of touch electrodes includes forming a first touch electrode layer comprising a plurality of first touch electrodes on the base substrate; forming an insulating layer on a side of the first touch electrode layer away from the base substrate; and forming a second touch electrode layer comprising a plurality of second touch electrodes on a side of the insulating layer away from the first touch electrode layer. Optionally, the orthographic projection of the first black matrix layer on the base substrate substantially covers an entirety of an orthographic projection of the plurality of first touch electrodes on the base substrate and substantially covers an entirety of an orthographic projection of the plurality of second touch electrodes on the base substrate. Optionally, the orthographic projection of the second black matrix layer on the base substrate substantially covers an entirety of the orthographic projection of the plurality of first touch electrodes on the base substrate and substantially covers an entirety of the orthographic projection of the plurality of second touch electrodes on the base substrate.

Optionally, the first black matrix layer is made of an insulating light absorbing material; and the plurality of first touch electrodes are formed to be in direct contact with the first black matrix layer.

Optionally, forming the counter substrate further includes forming a planarization layer on a side of the second touch electrode layer away from the base substrate; and forming a color filter layer comprising a plurality of color filter blocks in the subpixel region.

Optionally, the plurality of color filter blocks are formed to be in direct contact with the planarization layer; and the plurality of second touch electrodes are formed to be in direct contact with the planarization layer.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch control display panel having a subpixel region and an inter-subpixel region, comprising an array substrate and a counter substrate facing the array substrate;
   wherein the counter substrate comprises:
   a base substrate;
   a first black matrix layer on the base substrate;
   a plurality of touch electrodes on the base substrate; and
   a second black matrix layer on a side of the plurality of touch electrodes away from the first black matrix layer;
   wherein the first black matrix layer, the second black matrix layer, and the plurality of touch electrodes are in the inter-subpixel region;
   an orthographic projection of the first black matrix layer on the base substrate substantially covers an entirety of an orthographic projection of the plurality of touch electrodes on the base substrate; and
   an orthographic projection of the second black matrix layer on the base substrate substantially covers the entirety of the orthographic projection of the plurality of touch electrodes on the base substrate;
   wherein the plurality of touch electrodes comprise a first touch electrode layer and a second touch electrode layer;

the first touch electrode layer comprises a plurality of first touch electrodes on a side of the first black matrix layer away from the base substrate;

the second touch electrode layer comprises a plurality of second touch electrodes on a side of the first touch electrode layer away from the first black matrix layer;

the counter substrate further comprises an insulating layer between the first touch electrode layer and the second touch electrode layer;

the orthographic projection of the first black matrix layer on the base substrate substantially covers an entirety of an orthographic projection of the plurality of first touch electrodes on the base substrate and substantially covers an entirety of an orthographic projection of the plurality of second touch electrodes on the base substrate; and the orthographic projection of the second black matrix layer on the base substrate substantially covers an entirety of the orthographic projection of the plurality of first touch electrodes on the base substrate and substantially covers an entirety of the orthographic projection of the plurality of second touch electrodes on the base substrate.

2. The touch control display panel of claim 1, wherein the orthographic projection of the first black matrix layer on the base substrate and the orthographic projection of the second black matrix layer on the base substrate substantially overlap with each other.

3. The touch control display panel of claim 1, wherein the plurality of touch electrodes are a plurality of metal mesh touch electrodes.

4. A touch control display apparatus, comprising the touch control display panel of claim 1; and a back light on a side of the array substrate away from the counter substrate;
wherein the array substrate comprises a plurality of thin film transistors for driving image display of the touch control display apparatus;
wherein the touch control display panel further comprises a liquid crystal layer between the array substrate and the counter substrate;
the second black matrix layer is on a side of the liquid crystal layer away from the back light; and
the first black matrix layer is on a side of the second black matrix layer away from the liquid crystal layer.

5. The touch control display panel of claim 1, wherein the first black matrix layer is made of an insulating light absorbing material; and
the plurality of first touch electrodes are in direct contact with the first black matrix layer.

6. The touch control display panel of claim 5, further comprising a planarization layer on a side of the second touch electrode layer away from the base substrate; and
a color filter layer comprising a plurality of color filter blocks in the subpixel region.

7. The touch control display panel of claim 6, wherein the plurality of color filter blocks are in direct contact with the planarization layer; and
the plurality of second touch electrodes are in direct contact with the planarization layer.

8. A counter substrate having a subpixel region and an inter-subpixel region, comprising:
a base substrate;
a first black matrix layer on the base substrate;
a plurality of touch electrodes on the base substrate; and
a second black matrix layer on a side of the plurality of touch electrodes away from the first black matrix layer;

wherein the first black matrix layer, the second black matrix layer, and the plurality of touch electrodes are in the inter-subpixel region;

an orthographic projection of the first black matrix layer on the base substrate substantially covers an entirety of an orthographic projection of the plurality of touch electrodes on the base substrate; and an orthographic projection of the second black matrix layer on the base substrate substantially covers the entirety of the orthographic projection of the plurality of touch electrodes on the base substrate;

wherein the plurality of touch electrodes comprise a first touch electrode layer and a second touch electrode layer;

the first touch electrode layer comprises a plurality of first touch electrodes on a side of the first black matrix layer away from the base substrate;

the second touch electrode layer comprises a plurality of second touch electrodes on a side of the first touch electrode layer away from the first black matrix layer;

the counter substrate further comprises an insulating layer between the first touch electrode layer and the second touch electrode layer;

the orthographic projection of the first black matrix layer on the base substrate substantially covers an entirety of an orthographic projection of the plurality of first touch electrodes on the base substrate and substantially covers an entirety of an orthographic projection of the plurality of second touch electrodes on the base substrate; and the orthographic projection of the second black matrix layer on the base substrate substantially covers an entirety of the orthographic projection of the plurality of first touch electrodes on the base substrate and substantially covers an entirety of the orthographic projection of the plurality of second touch electrodes on the base substrate.

9. The counter substrate of claim 8, wherein the orthographic projection of the first black matrix layer on the base substrate and the orthographic projection of the second black matrix layer on the base substrate substantially overlap with each other.

10. The counter substrate of claim 8, wherein the plurality of touch electrodes are a plurality of metal mesh touch electrodes.

11. The counter substrate of claim 8, wherein the first black matrix layer is made of an insulating light absorbing material; and
the plurality of first touch electrodes are in direct contact with the first black matrix layer.

12. The counter substrate of claim 11, further comprising a planarization layer on a side of the second touch electrode layer away from the base substrate; and
a color filter layer comprising a plurality of color filter blocks in the subpixel region.

13. The counter substrate of claim 12, wherein the plurality of color filter blocks are in direct contact with the planarization layer; and
the plurality of second touch electrodes are in direct contact with the planarization layer.

14. A method of fabricating a touch control display panel having a subpixel region and an inter-subpixel region, comprising:
forming an array substrate;
forming a counter substrate; and
assembling the array substrate and the counter substrate into a cell;

wherein forming the counter substrate comprises:
forming a first black matrix layer on a base substrate;
forming a plurality of touch electrodes on the base substrate; and
forming a second black matrix layer on a side of the plurality of touch electrodes away from the first black matrix layer;
wherein the first black matrix layer, the second black matrix layer, and the plurality of touch electrodes are formed to be in the inter-subpixel region;
an orthographic projection of the first black matrix layer on the base substrate substantially covers an entirety of an orthographic projection of the plurality of touch electrodes on the base substrate; and
an orthographic projection of the second black matrix layer on the base substrate substantially covers the entirety of the orthographic projection of the plurality of touch electrodes on the base substrate;
wherein forming the plurality of touch electrodes comprises:
forming a first touch electrode layer comprising a plurality of first touch electrodes on the base substrate;
forming an insulating layer on a side of the first touch electrode layer away from the base substrate; and
forming a second touch electrode layer comprising a plurality of second touch electrodes on a side of the insulating layer away from the first touch electrode layer;
wherein the orthographic projection of the first black matrix layer on the base substrate substantially covers an entirety of an orthographic projection of the plurality of first touch electrodes on the base substrate and substantially covers an entirety of an orthographic projection of the plurality of second touch electrodes on the base substrate; and
the orthographic projection of the second black matrix layer on the base substrate substantially covers an entirety of the orthographic projection of the plurality of first touch electrodes on the base substrate and substantially covers an entirety of the orthographic projection of the plurality of second touch electrodes on the base substrate.

15. The method of claim 14, wherein the first black matrix layer is made of an insulating light absorbing material; and
the plurality of first touch electrodes are formed to be in direct contact with the first black matrix layer.

16. The method of claim 15, wherein forming the counter substrate further comprises:
forming a planarization layer on a side of the second touch electrode layer away from the base substrate; and
forming a color filter layer comprising a plurality of color filter blocks in the subpixel region.

17. The method of claim 16, wherein the plurality of color filter blocks are formed to be in direct contact with the planarization layer; and
the plurality of second touch electrodes are formed to be in direct contact with the planarization layer.

* * * * *